US012771271B2

(12) United States Patent
Barajas et al.

(10) Patent No.: US 12,771,271 B2
(45) Date of Patent: Oct. 20, 2026

(54) SYSTEM AND METHOD FOR LOAD TORQUE DISTURBANCE REJECTION OF BRUSHED DC MOTORS

(71) Applicant: Steering Solutions IP Holding Corporation, Saginaw, MI (US)

(72) Inventors: Jose De Jesus Barajas, Saginaw, MI (US); Md Abid Hossain, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 217 days.

(21) Appl. No.: 18/604,014

(22) Filed: Mar. 13, 2024

(65) Prior Publication Data

US 2025/0293625 A1 Sep. 18, 2025

(51) Int. Cl.
*H02P 7/34* (2016.01)
*H02P 21/18* (2016.01)
*H02P 21/20* (2016.01)

(52) U.S. Cl.
CPC .............. *H02P 21/20* (2016.02); *H02P 21/18* (2016.02)

(58) Field of Classification Search
CPC .......... H02P 21/08; H02P 21/14; H02P 21/18; H02P 21/30; H02P 2205/01; H02P 2205/05; H02P 25/024; H02P 25/03; H02P 25/089; H02P 27/085; H02P 29/0027; H02P 29/027; H02P 5/46; H02P 6/08; H02P 7/06
See application file for complete search history.

(56) References Cited

U.S. PATENT DOCUMENTS

2014/0149000 A1* 5/2014 Tamura ................ B62D 5/0463 701/42
2019/0097556 A1* 3/2019 Pramod ................... H02P 7/285
2020/0028454 A1* 1/2020 Kinomura ............... H02P 29/50

OTHER PUBLICATIONS

Budynas, Richard, et al., "Shingley's, Mechanical Engineering Design, 9th ed." pp. 410-419; Jan. 2010.
Golgouneh, Alireza, et al., "Design of a new, light and portable mechanism for knee CPM machine with a user-friendly interface." 2016 Artificial Intelligence and Robotics (IRANOPEN). IEEE, Apr. 2016.

* cited by examiner

*Primary Examiner* — Kawing Chan
*Assistant Examiner* — Charles S Laughlin
(74) *Attorney, Agent, or Firm* — Dickinson Wright PLLC

(57) ABSTRACT

A method for controlling a brushed DC motor includes: determining a speed difference signal based on a difference between a speed command signal and a motor speed; determining an initial voltage command based on the speed difference signal; determining a final voltage command based on the initial voltage command; applying a DC voltage based on the final voltage command to cause the brushed DC motor to turn a lead screw and to move a load along a path; determining a disturbance torque; and offsetting the disturbance torque by at least one of: determining a feedforward voltage command based on a position of the load along the path and determining the final voltage command as a sum of the initial voltage command and the feedforward voltage command; or determining a speed compensation signal based on the disturbance torque and determining the speed difference signal further based on the speed compensation signal.

15 Claims, 8 Drawing Sheets

SYSTEM AND METHOD FOR LOAD TORQUE DISTURBANCE REJECTION OF BRUSHED DC MOTORS

BACKGROUND

The present disclosure relates to methods and systems for operating brushed DC motors.

Brushed DC motors are used in various applications. One such application for brushed DC motors is in power steering systems for vehicles. Significant advantages of brushed DC motors, when compared with alternatives such as AC motors, include low-cost components, less circuitry, simplicity, and ease of control.

For ergonomic purposes, a steering column is adjustable in two directions, raking and telescoping directions. Raking direction allows the driver to adjust the steering column up and down while telescoping direction pulls it toward the driver direction or pushes it further from the driver. These adjustments can be made manually by unlocking a rake lever mechanism (manual columns) or by a DC motor actuator (power columns), in this case, one motor for each adjustment direction. As part of some power column requirements, it is to drive these DC motors at a specific speed profile and keep that speed constant even in the presence of signal disturbances. These signal disturbances are compound of friction forces and mass inertia. So, a DC motor speed controller should consider these disturbances for rejection and keep good control of motor speed.

In control theory, a robust controller is a design technique to take into account uncertainties and compensate for them in the system response. As part of a robust controller, a well-suited disturbance rejection is a key characteristic of that controller. Disturbances could be the sources of a controller malfunction, instability of a system, or a poor-quality response of the system.

SUMMARY

According to one or more embodiments, a method of controlling a brushed direct current (DC) motor includes: determining a speed difference signal based on a difference between a speed command signal and a motor speed of the brushed DC motor; determining an initial voltage command based on the speed difference signal; determining a final voltage command based on the initial voltage command; applying a DC voltage to the brushed DC motor based on the final voltage command and to cause the brushed DC motor to turn a lead screw and to thereby move a load along a path; determining a disturbance torque acting on the brushed DC motor; and modifying, to cause the brushed DC motor to produce a compensation torque offsetting the disturbance torque, at least one of the final voltage command and the speed difference signal. Modifying the at least one of the final voltage command and the speed difference signal may include at least one of: determining a feedforward voltage command based on a position of the load along the path and determining the final voltage command as a sum of the initial voltage command and the feedforward voltage command; or determining a speed compensation signal based on the disturbance torque and determining the speed difference signal further based on the speed compensation signal.

According to one or more embodiments, a motor control system is provided. The motor system includes: a brushed direct current (DC) motor having a set of brushes and configured to turn a lead screw and to thereby move a load along a path; a voltage regulator configured to apply a DC voltage to the brushed DC motor based on a final voltage command; and a controller. The controller is configured to: determine a speed difference signal based on a difference between a speed command signal and a motor speed of the brushed DC motor; determine an initial voltage command based on the speed difference signal; determine an initial voltage command based on the speed difference signal; determine the final voltage command based on the initial voltage command; determine a disturbance torque acting on the brushed DC motor via the lead screw; and modify, to cause the brushed DC motor to produce a compensation torque offsetting the disturbance torque, at least one of the final voltage command and the speed difference signal. Modifying the at least one of the final voltage command and the speed difference signal may include at least one of: determining a feedforward voltage command based on a position of the load along the path and determining the final voltage command as a sum of the initial voltage command and the feedforward voltage command; or determining a speed compensation signal based on the disturbance torque and determining the speed difference signal further based on the speed compensation signal.

According to one or more embodiments, a method of operating a brushed direct current (DC) motor is provided. The method includes: determining a speed difference signal based on a difference between a speed command signal and a motor speed of the brushed DC motor; determining an initial voltage command based on the speed difference signal; determining a final voltage command based on the initial voltage command; applying a DC voltage to the brushed DC motor based on the final voltage command; determining a disturbance torque acting on the brushed DC motor; and modifying the speed difference signal to cause the brushed DC motor to produce a compensation torque offsetting the disturbance torque. Modifying the speed difference signal may include determining a speed compensation signal based on the disturbance torque and determining the speed difference signal further based on the speed compensation signal.

These and other advantages and features will become more apparent from the following description taken in conjunction with the drawings.

BRIEF DESCRIPTION OF THE DRAWINGS

The subject matter of the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the figures, where the present disclosure will be described with reference to specific embodiments, without limiting the same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

The present disclosure provides systems and methods for a robust controller for a brushed DC motor. Feedforward type of control may be used to achieve desired robustness. This approach aims to control undesirable effects of measured disturbances before they are reflected in the output of the system and reduce the deviation of the output from the setpoint. In other words, it is a proactive method that minimizes the disturbances on the manipulated variable. Following this procedure, a Feedforward block is added to the DC motor model to compensate for the load and friction torques as a disturbance. Proper profiling of load and friction torques leads to better speed response with the proposed control algorithm.

Figure 1:
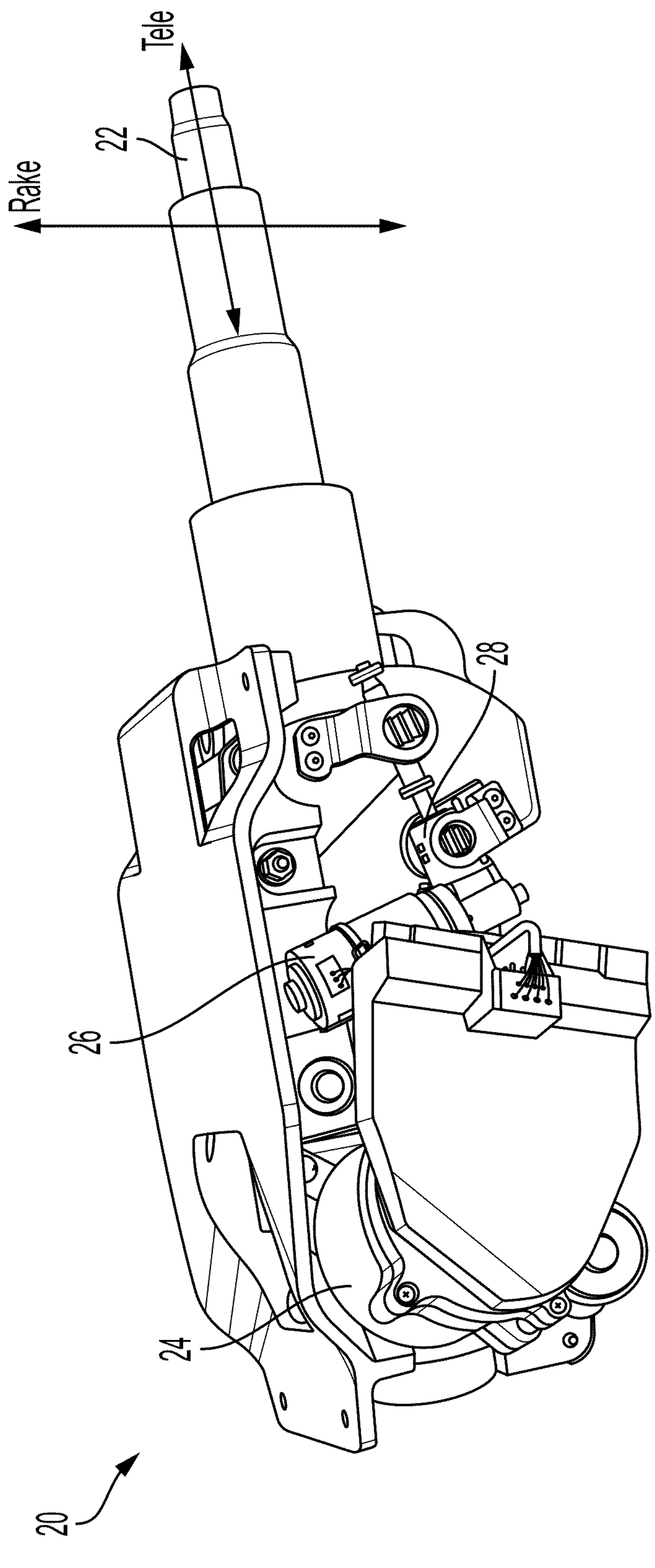
FIG. 1 shows a column position module (CPM) of a steering system in a vehicle, according to aspects of the present disclosure.

Referring now to the figures, where the technical solutions will be described with reference to specific embodiments, without limiting same, FIG. 1 shows an exemplary embodiment of a column position module (CPM) 20 of a steering system in a vehicle, and which may utilize the disclosed systems and methods for controlling a DC motor.

The CPM 20 includes a steering shaft 22 configured to attach to a steering wheel, which may also be called a hand wheel, that can be used by a person for steering a vehicle. The CPM 20 includes a steering actuator 24 attached to the steering shaft. The steering actuator 24 may supplement the person's application of force in order to provide power-assisted steering function. The CPM 20 also includes a telescoping actuator motor 26 configured to control an axial position of the handwheel by moving the steering shaft 22 in an axial direction. The CPM 20 also includes a rake actuator motor 28 configured to control a vertical position of the handwheel by moving an end the steering shaft in a radial direction.

Any or all of the steering actuator 24, the telescoping actuator motor 26 and/or the rake actuator motor 28 may include brushed DC motors and may be controlled using the systems and methods of the present disclosure. However, the systems and methods of the present disclosure may be used with brushed DC motors in other applications in a vehicle, such as for window or lock actuators. The systems and methods of the present disclosure are not limited to use in vehicles, and may be used with brushed DC motors in a variety of different applications.

Figure 2:
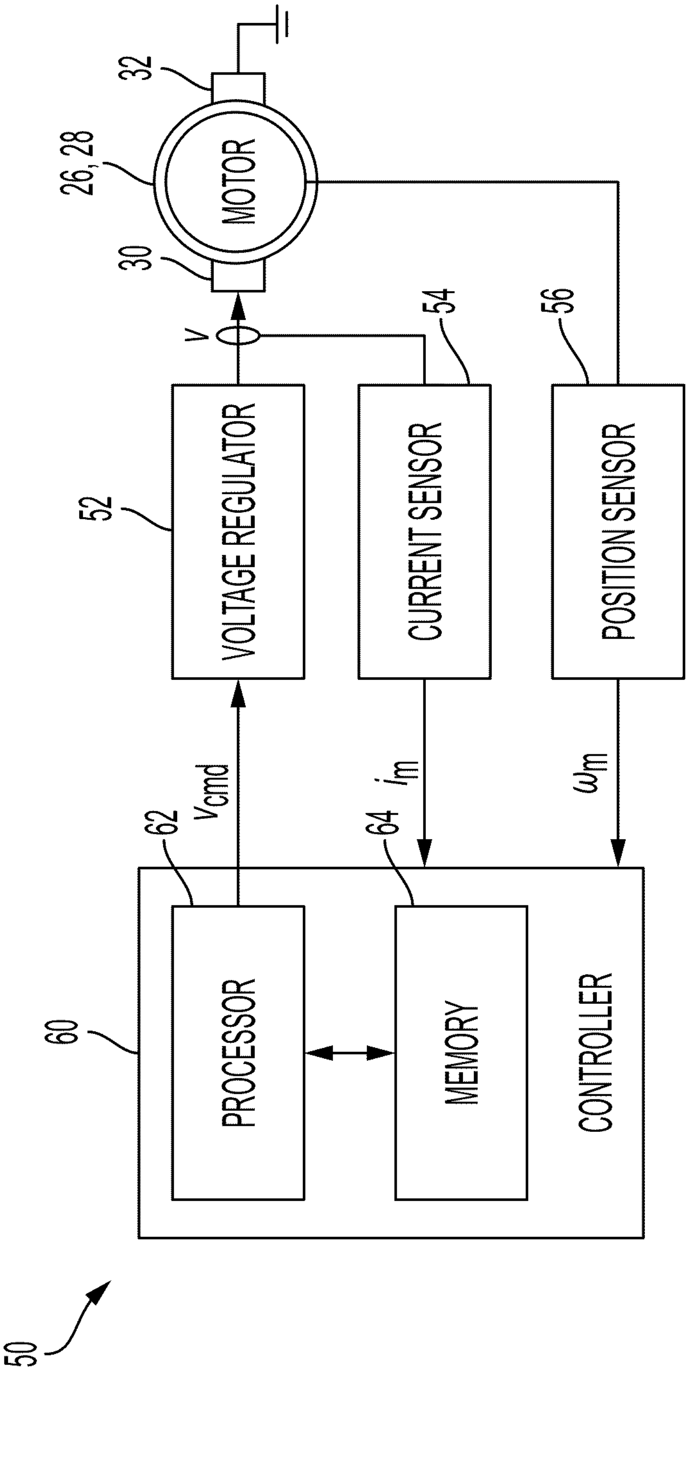
FIG. 2 shows a schematic block diagram of a system for controlling a brushed DC motor, according to aspects of the present disclosure.

FIG. 2 shows a schematic block diagram of a system 50 for controlling a brushed DC motor 26, 28. As shown in FIG. 2, the brushed DC motor 26, 28 includes a set of brushes 30, 32 for transmitting DC current from a stationary terminal to a rotor winding. The set of brushes 30, 32 includes a first brush 30 configured to be connected to a power source for receiving a DC current. The set of brushes 30, 32 also includes a second brush 32 configured to be connected to a current sink, such as a ground terminal.

The system 50 includes a controller 60. The controller 60 may include any suitable controller, such as an electronic control unit or other suitable controller. The controller 60 may be configured to control, for example, the various functions of the steering system and/or various functions of a vehicle. The controller 60 may include a processor 62 and a memory 64. The processor 62 may include any suitable processor, such as those described herein. Additionally, or alternatively, the controller 60 may include any suitable number of processors, in addition to or other than the processor 62. The memory 64 may comprise a single disk or a plurality of disks (e.g., hard drives), and includes a storage management module that manages one or more partitions within the memory 64. In some embodiments, memory 64 may include flash memory, semiconductor (solid state) memory or the like. The memory 64 may include Random Access Memory (RAM), a Read-Only Memory (ROM), or a combination thereof. The memory 64 may include instructions that, when executed by the processor 62, cause the processor 62 to, at least, control various aspects of the vehicle. Additionally, or alternatively, the memory 64 may include instructions that, when executed by the processor 62, cause the processor 62 to perform functions associated with the systems and methods described herein.

The controller 60 may be operably connected to a voltage regulator 52. The voltage regulator 52 may be configured to apply a DC voltage v to the first brush 30 of the brushed DC motor 26, 28. The voltage regulator 52 may generate the DC voltage v based on a final voltage command $v_{cmd}$ from the controller 60.

In some embodiments, and as shown in FIG. 2, the system 50 may include a current sensor 54 configured to measure the DC current supplied to the brushed DC motor 26, 28 and to transmit a motor current signal $i_m$ to the controller 60, representing an actual motor current in a winding of the brushed DC motor 26, 28. Additionally or alternatively, and as also shown in FIG. 2, the system 50 may include a position sensor 56 and configured to measure a rotational position of the brushed DC motor 26, 28 and to transmit a motor position signal Om to the controller 60.

In some embodiments, the controller 60 may perform the methods described herein. However, the methods described herein as performed by the controller 60 are not meant to be limiting, and any type of software executed on a controller or processor can perform the methods described herein without departing from the scope of this disclosure. For example, a controller, such as a processor executing software within a computing device, can perform the methods described herein.

Figure 3A:
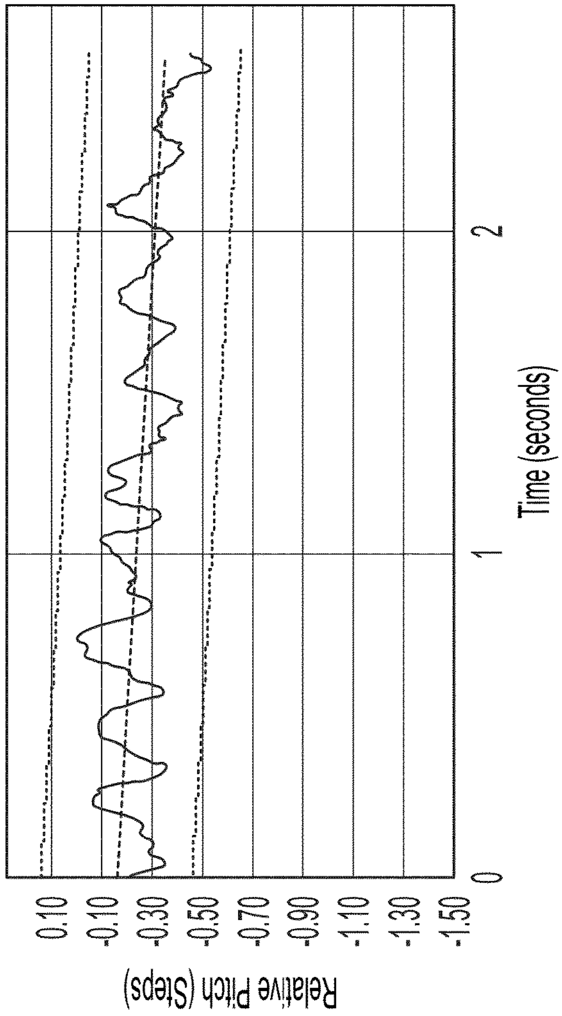
FIG. 3A shows a graph of relative pitch over time for a CPM module moving in a column down direction, according to aspects of the present disclosure.
Figure 3B:
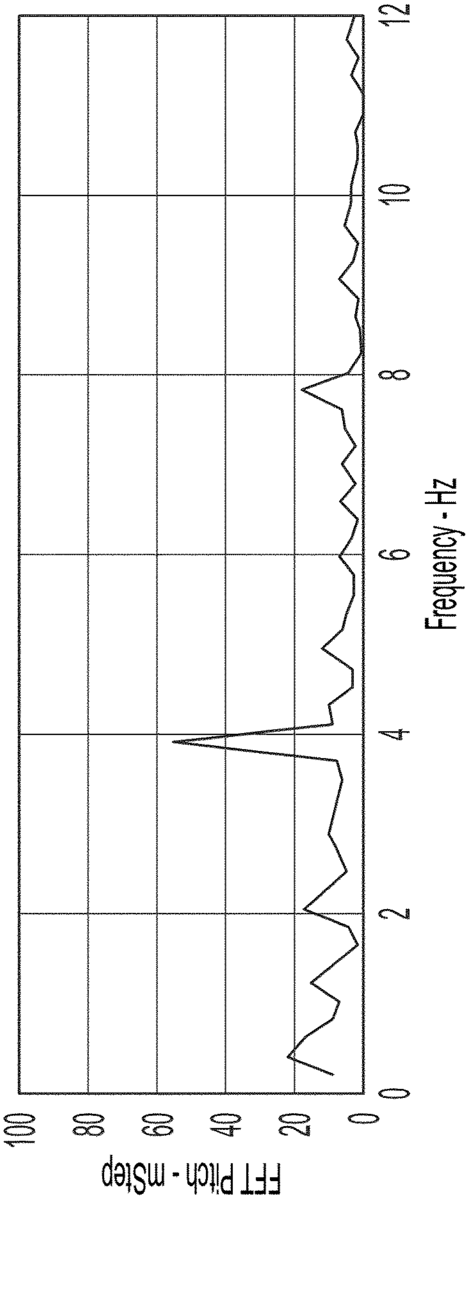
FIG. 3B shows a graph showing a fast Fourier transform (FFT) analysis of pitch vs. frequency for the CPM module moving in the column down direction.

FIG. 3A shows a graph of relative pitch over time for the rake actuator motor 28 moving the CPM 20 in a column down direction. FIG. 3B shows a graph showing a fast Fourier transform (FFT) analysis of pitch vs. frequency for the CPM module moving in the column down direction. FIG. 3 shows a large spike at about 4 Hz. This spike represents undesirable noise or vibration that may be perceptible to a person using the CPM. Similar undesirable noise or vibration may be produced by the rake actuator motor 28 moving in either direction or by the telescoping actuator motor 26 moving in either direction. It is an object of the method and system of the present disclosure to minimize or eliminate such vibration that can otherwise cause undesired noise and vibration. Moreover, the techniques of the present disclosure may be applicable reducing noise or vibration in any brushed DC motor application.

Figure 4:
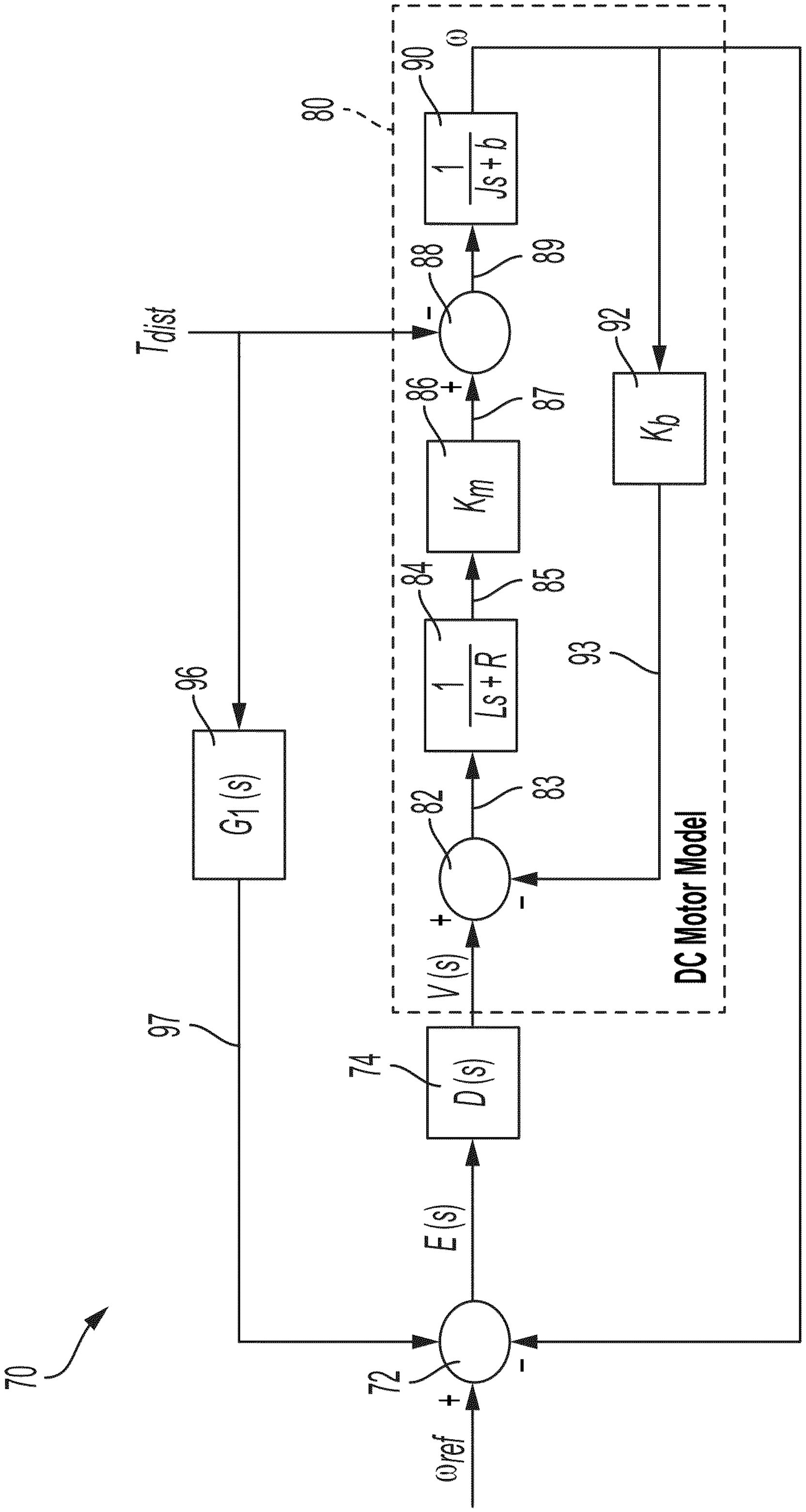
FIG. 4 shows a schematic block diagram of a motor control system for operating a DC motor, according to aspects of the present disclosure.

FIG. 4 shows a schematic block diagram of a motor control system 70 for operating a DC motor, according to aspects of the present disclosure. The motor control system 70 is configured as a speed-to-torque controller. However, the principles of the present disclosure may be applied to other controller configurations.

The motor control system 70 includes a first subtractor 72 configured to subtract the motor speed ω from a speed command signal $\omega_{ref}$, and to compute a speed difference signal $\omega_{diff}$ representing the difference between the speed command signal $\omega_{ref}$ and the motor speed ω. The first subtractor 72 also computes a speed error signal E(s), by adding a first modification signal 97 to the speed command signal $\omega_{ref}$.

The motor control system 70 also includes a voltage command generator 74 that is configured to generate an initial voltage command signal V(s). The voltage command generator 74 may use a proportional-integral (PI) control loop to generate the initial voltage command signal V(s). However, other control techniques may be used, such as a proportional-integral-derivative (PID) control loop, or a lookup table. In some embodiments, the initial voltage command signal V(s) may be used directly as the final voltage command $v_{cmd}$ for the voltage regulator 52. Alternatively, the initial voltage command signal V(s) may modified to determine the final voltage command $v_{cmd}$.

The motor control system 70 also includes a DC motor model 80 representing the brushed DC motor 26, 28. The DC motor model 80 includes a second subtractor 82 that determines an applied voltage signal 83 by subtracting a back-EMF voltage signal 93 from the initial voltage command signal V(s). The DC motor model 80 also includes a first transform 84 which takes the applied voltage signal 83 and which computes a first intermediate signal 85 by dividing the applied voltage signal 83 by $L_s$+R, where $L_s$ is an inductance value and R is a resistance value. The DC motor model 80 also includes a first multiplier 86 configured to multiply the first intermediate signal 85 by a motor torque constant $K_m$ and to thereby determine a generated torque signal 87.

The DC motor model 80 also includes a third subtractor 88 that determines a total torque signal 89 by subtracting a disturbance torque $T_{dist}$ from the generated torque signal 87. The DC motor model 80 also includes second transform 90 which takes the total torque signal 89 and which computes a motor speed signal ω by dividing the total torque signal 89 by $J_s$+b, where $J_s$ is rotational inertia, s is the Laplace domain variable, and b is a motor viscous friction constant.

In some embodiments, and as shown in FIG. 4, the motor control system 70 includes a feedforward controller 96 that is configured to generate the first modification signal 97 based on the disturbance torque $T_{dist}$ and to cause brushed DC motor 26, 28 to produce a compensation torque offsetting the disturbance torque $T_{dist}$. The feedforward controller 96 may be labeled $G_1(s)$, and its operation is described in further detail, below.

The present disclosure provides a first method to compensate or offset the disturbance torque $T_{dist}$. First, the load-friction torque needs to be profiled. The relation between torque to voltage is given in equation (1):

$$\tau = Ki \approx \frac{K(v - K\omega)}{R + sL} \tag{1}$$

where τ represents motor torque i is motor current, K is an electromotive force constant, v is a DC input voltage, ω is motor speed (in rad/sec), R is electric resistance, L is electric inductance, and s is the Laplace complex variable.

Since we are relating the disturbances due to load friction torques and the associated terms will be added as feedforward terms in the voltage command equation as $v_{ff}$, equation (1) can be written as equation (2):

$$v_{ff} = \frac{R + sL}{K}\tau_{LF}(\theta) \tag{2}$$

In the time domain this equation can be written as equation (3):

$$v_{ff} = \frac{R}{K}\tau_{LF}(\theta) + \frac{L}{K}\frac{d\tau_{LF}(\theta)}{dt} \tag{3}$$

The brushed DC motors 26, 28 of the CPM 20 are relatively small and R>>L. Thus, equation (3) can be simplified to equation (4).

$$v_{ff} = \frac{R}{K}\tau_{LF}(\theta) \tag{4}$$

So, this feedforward voltage term $v_{ff}$ can be added up to the output of the speed controller $v_{ctrl}$, such a classical PID, to cancel the disturbance torque $T_{dist}$.

$$v_{cmd} = v_{ctrl} + v_{ff} \tag{5}$$

The present disclosure also provides a second method to compensate or offset the disturbance torque $T_{dist}$. If the disturbance torque $T_{dist}$ can be measured or otherwise determined, the feedforward transfer function $G_1(s)$ may be used to cancel the disturbance effects at the output of a system, as shown on FIG. 4.

The motor control system 70 of FIG. 4 can be described by equations (6)-(8):

$$\omega(s) = \left[\left(\frac{K_m}{Ls + R}\right)(V(s) - \omega(s)k_b) - T_{dist}\right]\left[\frac{1}{Js + b}\right] \tag{6}$$

-continued $$V(s) = E(s)D(s) \tag{7}$$

$$E(s) = \omega_{ref}(s) - \omega(s) + G_1(s)T_{dist} \tag{8}$$

Equations (6)-(8) can be combined as equation (9):

$$\omega(s) = \left[1 + \left(\frac{D(s)K_m}{Ls+R}\right)\left[1 + \frac{K_bK_m}{(Ls+R)(Js+b)}\right]^{-1}\right]^{-1}\left[\frac{D(s)K_m\omega_{ref}(s)}{Ls+R} + \dots\right.$$
$$\left.\dots + \frac{D(s)K_m}{Ls+R}G_1(s)T_{dist} - T_{dist}\right]\left[1 + \frac{K_bK_m}{(Ls+R)(Js+b)}\right] \tag{9}$$

To eliminate the effect of the disturbance torque $T_{dist}$, terms of equation (9) may be set as set forth in equations (10)-(11), below:

$$\frac{D(s)K_m}{Ls+R}G_1(s)T_{dist} - T_{dist} = 0 \tag{10}$$

$$G_1(s) = \frac{Ls+R}{D(s)K_m} \tag{11}$$

In some cases, the disturbance torque $T_{dist}$ may be estimated from the current, and motor speed measurements according to the following state equations (12)-(15).

$$J\dot{\omega} = K_b i - b\omega - T_{dist} \tag{12}$$

$$L\frac{di}{dt} = V - K_m\omega - Ri \tag{13}$$

$$\begin{bmatrix} \dot{\omega} \\ \frac{di}{dt} \\ \dot{T}_{dist} \end{bmatrix} = \begin{bmatrix} -\frac{b}{J} & \frac{K_b}{J} & -\frac{1}{J} \\ -\frac{K_m}{L} & -\frac{R}{L} & 0 \\ 0 & 0 & 1 \end{bmatrix}\begin{bmatrix} \omega \\ i \\ T_{dist} \end{bmatrix} + \begin{bmatrix} 0 \\ 1/L \\ 0 \end{bmatrix}V \tag{14}$$

$$y = \begin{bmatrix} \omega \\ i \end{bmatrix} = \begin{bmatrix} 1 & 0 & 0 \\ 0 & 1 & 0 \end{bmatrix}\begin{bmatrix} \omega \\ i \\ T_{dist} \end{bmatrix} \tag{15}$$

A Luenberger Observer may be used to compute an estimate of the disturbance torque $T_{dist}$, as set forth in equations (16)-(17)

$$\dot{x}_e = Ax_e + Bu + G(y - Cx_e) \tag{16}$$

$$A = \begin{bmatrix} -\frac{b}{J} & \frac{K_b}{J} & -\frac{1}{J} \\ -\frac{K_m}{L} & -\frac{R}{L} & 0 \\ 0 & 0 & 1 \end{bmatrix}, B = \begin{bmatrix} 0 \\ 1/L \\ 0 \end{bmatrix}, C = \begin{bmatrix} 1 & 0 & 0 \\ 0 & 1 & 0 \end{bmatrix} \tag{17}$$

Where $x_e$ is the state estimator, and G is an observer gain matrix. Thus, equation (16) can be rewritten as equation (18):

$$\dot{x}_e = (A - GC)x_e + Bu + Gy \tag{18}$$

Observer terms $A_{obs}$, $B_{obs}$, $C_{obs}$, $D_{obs}$ can be determined as set forth in equation set (19):

$$A_{obs} = (A - GC) \tag{19}$$
$$B_{obs} = [B \;\; G]$$
$$C_{obs} = [0 \;\; 0 \;\; 1]$$
$$D_{obs} = [0 \;\; 0]$$

Figure 5C:
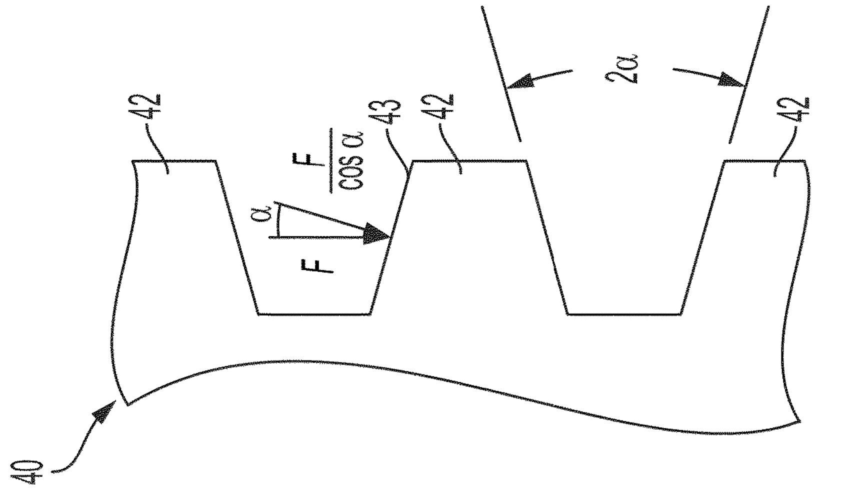
FIGS. 5A-5C show various schematic views of a lead screw mechanism.
Figure 5A:
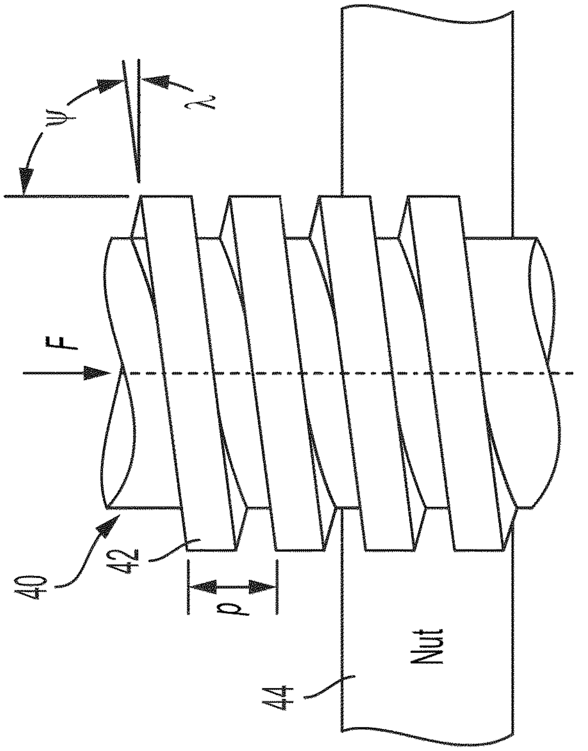
Figure 5B:
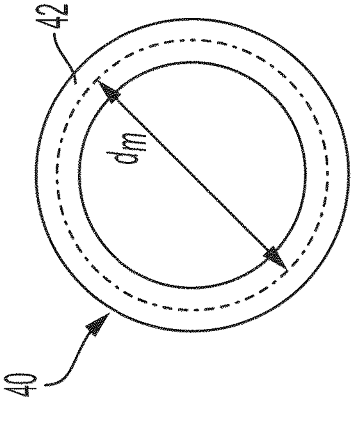

FIGS. 5A-5C show various schematic views of a lead screw mechanism 40. The lead screw mechanism 40 may be used in the CPM 20 to convert rotational force from one of the brushed DC motor 26, 28 to linear motion for moving the CPM 20 in a corresponding telescopic or rake movement. The disturbance torque $T_{dist}$ may be transmitted to the brushed DC motor 26, 28 and affected by the lead screw mechanism 40.

As shown, the lead screw mechanism 40 includes a lead screw 42 having an external thread and which engages a lead nut 44.

For a lead screw mechanism 40 with an Acme thread, as shown, including the lead screw 42 with a thread having a trapezoidal cross-section to define a ramp 43 that engages the lead nut 44, torque T on the lead screw may be related to the force F applied by the lead nut 44 as set forth in equation (20):

$$T = \frac{Fd_m}{2}\left(\frac{l + \pi f d_m \sec\alpha}{\pi d_m - fl \sec\alpha}\right) \tag{20}$$

where $d_m$ is the mean diameter of the lead screw 42, l is a lead and is equal to pitch P for the lead screw 42 with a single-thread configuration, and sec α is the secant of the thread angle α.

Figure 6:
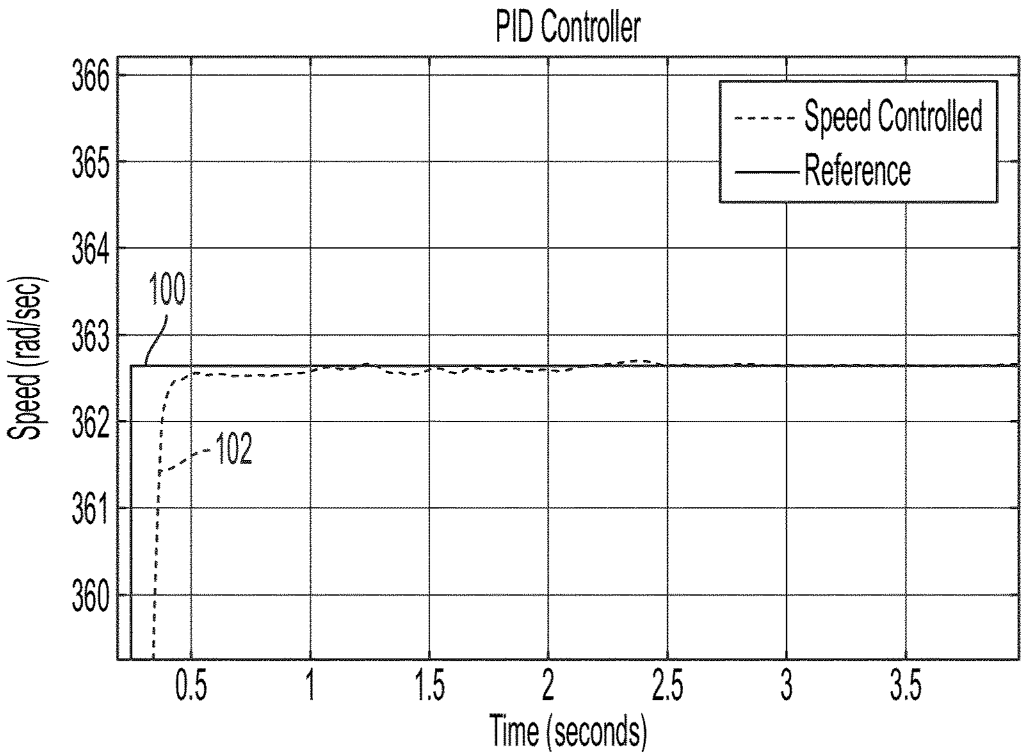
FIG. 6 shows a graph of motor speed vs. time for a DC brushed motor controlled by a PI control loop responding to a step change speed command and without torque disturbance rejection.

FIG. 6 shows a graph of motor speed vs. time for a DC brushed motor controlled by a PI control loop responding to a step change speed command and without torque disturbance rejection. FIG. 6 includes a first plot 100 showing a speed command signal $\omega_{ref}$, also called a speed reference, with a step change at time 0.1 s, to 362.5 rad/sec. FIG. 6 also includes a second plot 102 showing the motor speed ω that increases after time 0.1 s to approach the 362.5 rad/sec value of the speed command signal $\omega_{ref}$, and which exhibits variable oscillation until about time=3.0 seconds.

Figure 7:
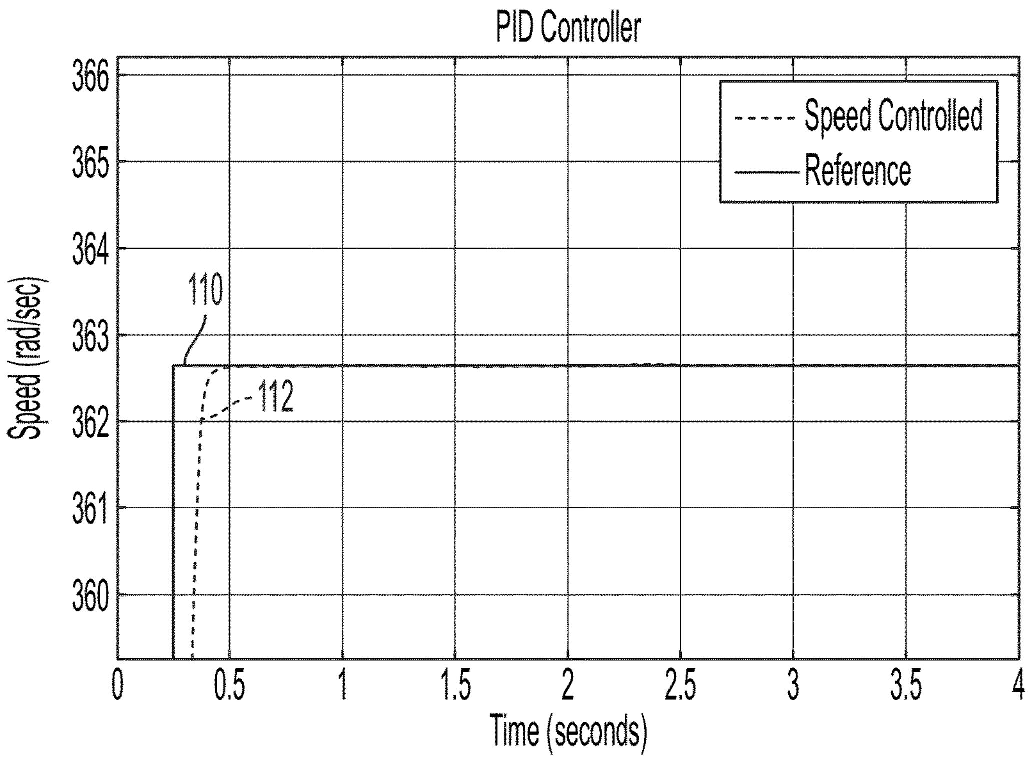
FIG. 7 shows a graph of motor speed vs. time for a DC brushed motor controlled by a PI control loop responding to a step change speed command and with torque disturbance rejection, according to aspects of the present disclosure.

FIG. 7 shows a graph of motor speed vs. time for a DC brushed motor controlled by a PI control loop responding to a step change speed command and with torque disturbance rejection, according to aspects of the present disclosure. FIG. 7 includes a third plot 110 showing a speed command signal $\omega_{ref}$, also called a speed reference, with a step change at time 0.1 s, to 362.5 rad/sec. FIG. 7 also includes a fourth plot 112 showing the motor speed ω that increases after time 0.1 s to approach the 362.5 rad/sec value of the speed command signal $\omega_{ref}$, and which exhibits some oscillation until about time—2.5 s, but where the oscillation is much reduced compared to the oscillation of the second plot 102 of FIG. 6.

Figure 8A:
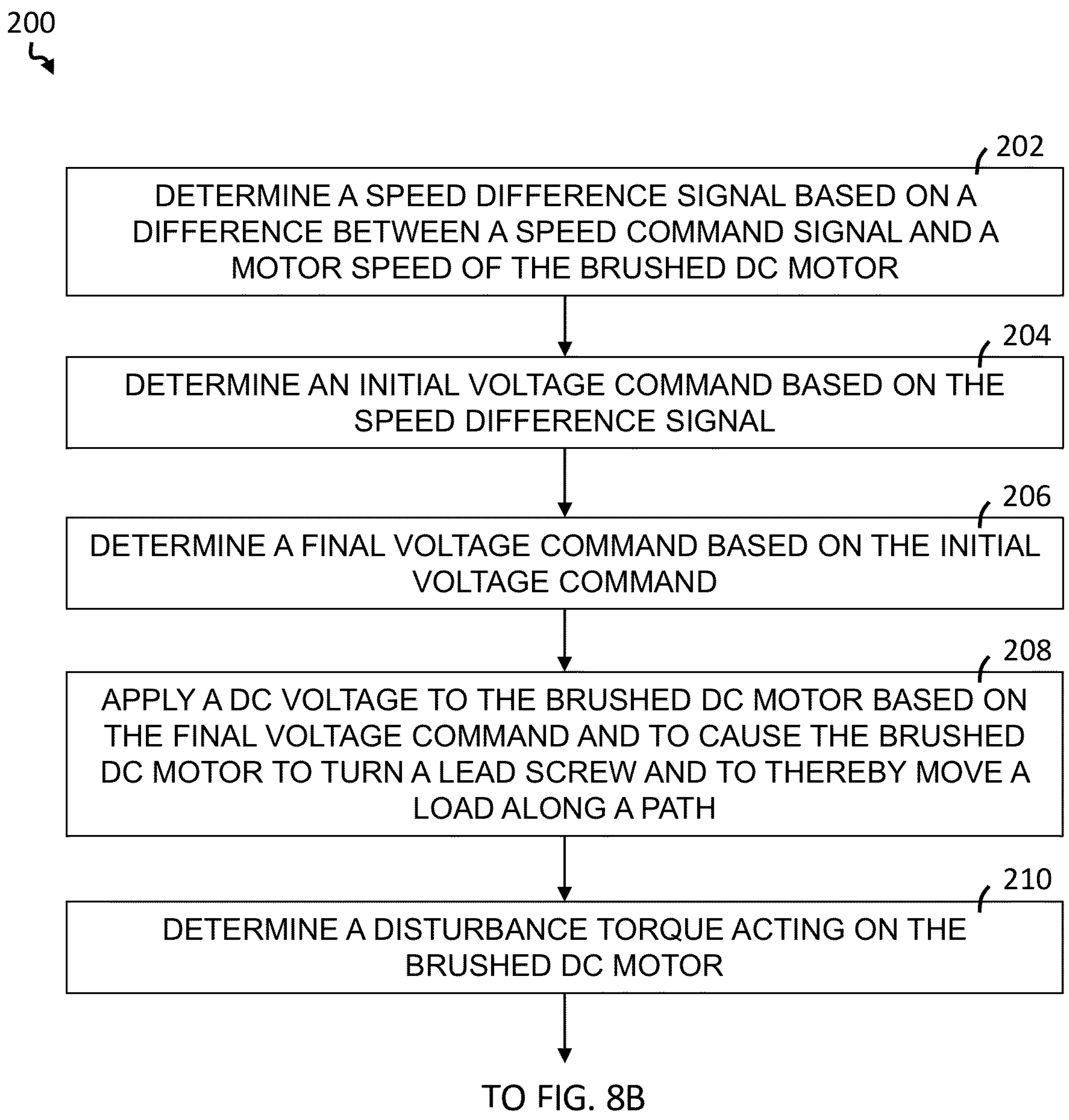
FIGS. 8A-8B show a flow diagram listing steps in a method for operating a brushed DC motor, according to aspects of the present disclosure.
Figure 8B:
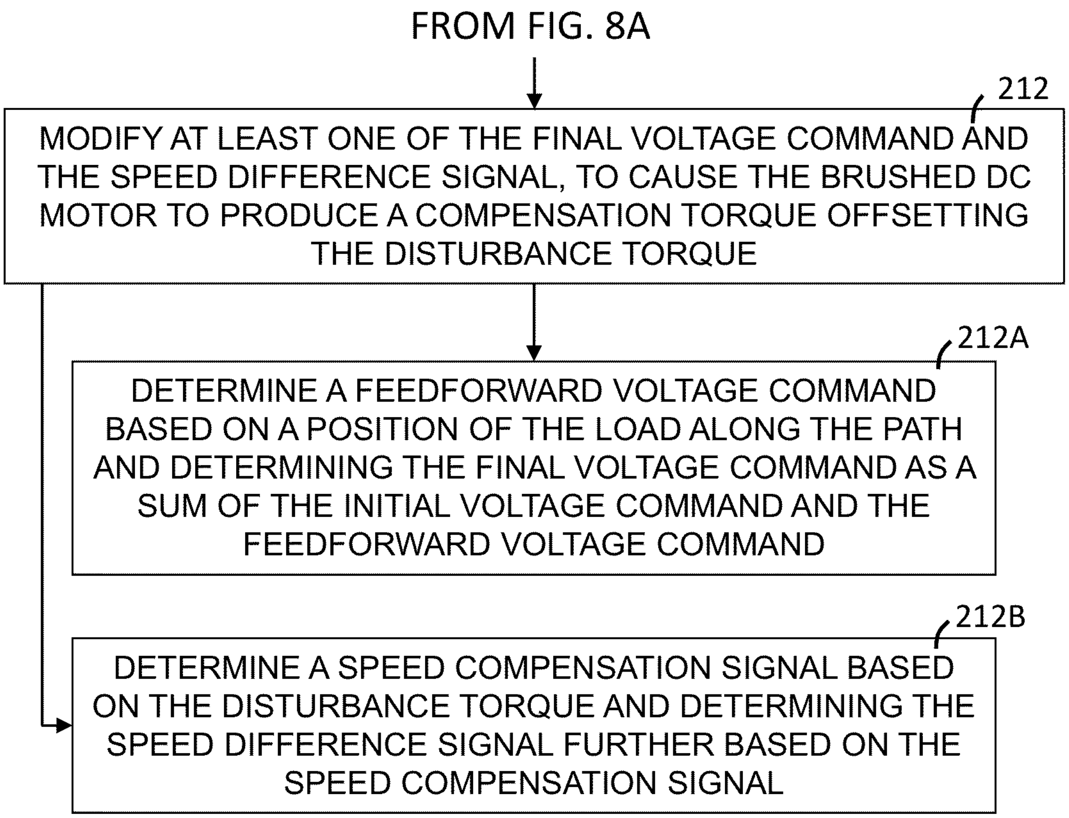

FIGS. 8A-8B show a flow diagram listing steps in a method 200 for controlling a brushed DC motor, according to aspects of the present disclosure. The method 200 can be performed by the motor control system 70 of the present disclosure. As can be appreciated in light of the disclosure, the order of operation within the method is not limited to the sequential execution as illustrated in FIGS. 8A-8B, but may be performed in one or more varying orders as applicable and in accordance with the present disclosure.

At 202, the method 200 determines a speed difference signal based on a difference between a speed command signal and a motor speed of the brushed DC motor. For example, the processor 62 may execute instructions to implement the subtractor 72 to compute the speed difference signal $\omega_{diff}$ representing the difference between the speed command signal $\omega_{ref}$ and the motor speed $\omega_m$.

At 204, the method 200 determines an initial voltage command based on the speed difference signal. For example, the processor 62 may execute instructions to implement the voltage command generator 74 to compute the initial voltage command signal V(s).

At 206, the method 200 determines a final voltage command based on the initial voltage command. For example, the processor 62 may execute instructions to determine the final voltage command $v_{cmd}$ based on the initial voltage command signal V(s). In some embodiments, the initial voltage command signal V(s) may be used directly as the final voltage command $v_{cmd}$ for the voltage regulator 52. Alternatively, the initial voltage command signal V(s) may modified to determine the final voltage command $v_{cmd}$.

At 208, the method 200 applies a DC voltage to the brushed DC motor based on the final voltage command and to cause the brushed DC motor to turn a lead screw and to thereby move a load along a path. For example, the voltage regulator 52 may generate and apply the DC voltage v to the first brush 30 of the brushed DC motor 26, 28, with the DC voltage v based on the final voltage command $v_{cmd}$ from the controller 60.

At 210 the method 200 determines a disturbance torque acting on the brushed DC motor. For example, the processor 62 may execute instructions to measure or to estimate the disturbance torque $T_{dist}$ as set forth in the present disclosure.

At 212 the method 200 modifies at least one of the final voltage command and the speed difference signal, to cause the brushed DC motor to produce a compensation torque offsetting the disturbance torque.

Step 212 may include determining, at step 212A, a feedforward voltage command based on a position of the load along the path and determining the final voltage command as a sum of the initial voltage command and the feedforward voltage command. For example, the processor 62 may execute instructions to compute the feedforward voltage command $v_{ff}$ and to modify the initial voltage command signal V(s) by adding the feedforward voltage command $v_{ff}$ to determine the final voltage command $v_{cmd}$.

Alternatively or additionally, step 212 may include determining, at step 212B, a speed compensation signal based on the disturbance torque and determining the speed difference signal further based on the speed compensation signal. For example, the processor 62 may execute instructions to implement the first subtractor 72 to compute the speed error signal E(s), by adding a first modification signal 97 to the speed command signal $\omega_{ref}$.

In some embodiments, determining the feedforward voltage command at step 212A includes determining the feedforward voltage command $v_{ff}$ in accordance with:

$$v_{ff} = \frac{R}{K}\tau_{LF}(\theta),$$

where R is an electrical resistance of the brushed DC motor, K is an electromotive force constant, θ is the position of the load along the path, and $\tau_{LF}(\theta)$ is the disturbance torque as a function of the position θ of the load.

In some embodiments, determining the speed compensation signal at step 212B includes determining the speed compensation signal ω(s) in accordance with:

$$\omega(s) = T_{dist}\frac{Ls+R}{D(s)K_m},$$

where $T_{dist}$ is the disturbance torque, L is an inductance of the brushed DC motor, s is a Laplace domain variable, R is an electrical resistance of the brushed DC motor, D(s) is a transfer function describing a relationship between the speed difference signal and the final voltage command, and $K_m$ is a motor torque constant.

In some embodiments, determining the disturbance torque at step 210 includes measuring the disturbance torque.

In some embodiments, determining the disturbance torque at step 210 includes estimating the disturbance torque based on: a motor current in the brushed DC motor, and the motor speed of the brushed DC motor.

In some embodiments, estimating the disturbance torque includes computing an estimated disturbance torque in accordance with: $J\dot{\omega}=K_m i-b\omega-T_{dist}$, where J is rotational inertia, $\dot{\omega}$ is a derivative of the motor speed of the brushed DC motor, $K_m$ is a motor torque constant, i is the motor current in the brushed DC motor, b is a motor viscous friction constant, ω is the motor speed of the brushed DC motor, and $T_{dist}$ is the disturbance torque.

In some embodiments, estimating the disturbance torque includes computing the disturbance torque using a Luenberger observer in accordance with: $\dot{x}_e=(A-GC)x_e+Bu+Gy$, where $\dot{x}_e$ is a derivative of a state estimator, $x_e$ is the state estimator, G is an observer gain matrix, and where:

$$A = \begin{bmatrix} -\frac{b}{J} & \frac{K_b}{J} & -\frac{1}{J} \\ -\frac{K_m}{L} & -\frac{R}{L} & 0 \\ 0 & 0 & 1 \end{bmatrix}, B = \begin{bmatrix} 0 \\ 1/L \\ 0 \end{bmatrix},$$

$$C = \begin{bmatrix} 1 & 0 & 0 \\ 0 & 1 & 0 \end{bmatrix}, y = \begin{bmatrix} \omega \\ i \end{bmatrix} = \begin{bmatrix} 1 & 0 & 0 \\ 0 & 1 & 0 \end{bmatrix}\begin{bmatrix} \omega \\ i \\ T_{dist} \end{bmatrix},$$

u is the DC voltage applied to the brushed DC motor, J is rotational inertia, L is an inductance of the brushed DC motor, R is an electrical resistance of the brushed DC motor, $K_b$ is a motor back-EMF constant, $K_m$ is a motor torque constant, i is the motor current in the brushed DC motor, b is a motor viscous friction constant, ω is the motor speed of the brushed DC motor, and $T_{dist}$ is the disturbance torque.

The present disclosure provides a method of controlling a brushed direct current (DC) motor. The method includes: determining a speed difference signal based on a difference between a speed command signal and a motor speed of the brushed DC motor; determining an initial voltage command based on the speed difference signal; determining a final voltage command based on the initial voltage command; applying a DC voltage to the brushed DC motor based on the final voltage command and to cause the brushed DC motor to turn a lead screw and to thereby move a load along a path; determining a disturbance torque acting on the brushed DC motor; and modifying, to cause the brushed DC motor to produce a compensation torque offsetting the disturbance torque, at least one of the final voltage command and the speed difference signal. In some embodiments, modifying the at least one of the final voltage command and the speed difference signal includes at least one of: determining a feedforward voltage command based on a position of the load along the path and determining the final voltage command as a sum of the initial voltage command and the feedforward voltage command; or determining a speed compensation signal based on the disturbance torque and determining the speed difference signal further based on the speed compensation signal.

In some embodiments, the method further includes determining the feedforward voltage command based on the position of the load along the path, and modifying the at least one of the final voltage command and the speed difference signal includes determining the final voltage command as a sum of the initial voltage command and the feedforward voltage command.

In some embodiments, determining the feedforward voltage command includes determining the feedforward voltage command $v_{ff}$ in accordance with:

$$v_{ff} = \frac{R}{K}\tau_{LF}(\theta),$$

where R is an electrical resistance of the brushed DC motor, K is an electromotive force constant, θ is the position of the load along the path, and $\tau_{LF}(\theta)$ is the disturbance torque as a function of the position θ of the load.

In some embodiments, the method further includes determining the speed compensation signal based on the disturbance torque, and to cause the brushed DC motor to produce a compensation torque to offset the disturbance torque, and modifying the at least one of the final voltage command and the speed difference signal includes determining the speed difference signal further based on the speed compensation signal.

In some embodiments, determining the speed compensation signal includes determining the speed compensation signal ω(s) in accordance with:

$$\omega(s) = T_{dist}\frac{Ls + R}{D(s)K_m},$$

where $T_{dist}$ is the disturbance torque, Ls is an inductance of the brushed DC motor, R is an electrical resistance of the brushed DC motor, D(s) is a transfer function describing a relationship between the speed difference signal and the final voltage command, and $K_m$ is a motor torque constant.

In some embodiments, determining the disturbance torque includes measuring the disturbance torque.

In some embodiments, determining the disturbance torque includes estimating the disturbance torque based on: a motor current in the brushed DC motor, and the motor speed of the brushed DC motor.

In some embodiments, estimating the disturbance torque includes computing an estimated disturbance torque in accordance with: $J\dot{\omega}=K_m i-b\omega-T_{dist}$: Where J is rotational inertia, $\dot{\omega}$ is a derivative of the motor speed of the brushed DC motor, $K_m$ is a motor torque constant, i is the motor current in the brushed DC motor, b is a motor viscous friction constant, ω is the motor speed of the brushed DC motor, and $T_{dist}$ is the disturbance torque.

In some embodiments, estimating the disturbance torque includes computing the disturbance torque using a Luenberger observer in accordance with: $\dot{x}_e=(A-GC)x_e+Bu+Gy$, where $\dot{x}_e$ is a derivative of a state estimator, $x_e$ is the state estimator, G is an observer gain matrix, and where:

$$A = \begin{bmatrix} -\frac{b}{J} & \frac{K_b}{J} & -\frac{1}{J} \\ -\frac{K_m}{L} & -\frac{R}{L} & 0 \\ 0 & 0 & 1 \end{bmatrix}, B = \begin{bmatrix} 0 \\ 1/L \\ 0 \end{bmatrix},$$

$$C = \begin{bmatrix} 1 & 0 & 0 \\ 0 & 1 & 0 \end{bmatrix}, y = \begin{bmatrix} \omega \\ i \end{bmatrix} = \begin{bmatrix} 1 & 0 & 0 \\ 0 & 1 & 0 \end{bmatrix}\begin{bmatrix} \omega \\ i \\ T_{dist} \end{bmatrix},$$

u is the DC voltage applied to the brushed DC motor, J is rotational inertia, L is an inductance of the brushed DC motor, R is an electrical resistance of the brushed DC motor, $K_b$ is a motor back-EMF constant, $K_m$ is a motor torque constant, i is the motor current in the brushed DC motor, b is a motor viscous friction constant, ω is the motor speed of the brushed DC motor, and $T_{dist}$ is the disturbance torque.

The present disclosure also provides a motor control system. The motor control system includes: a brushed direct current (DC) motor having a set of brushes and configured to turn a lead screw and to thereby move a load along a path; a voltage regulator configured to apply a DC voltage to the brushed DC motor based on a final voltage command; and a controller. The controller is configured to: determine a speed difference signal based on a difference between a speed command signal and a motor speed of the brushed DC motor; determine an initial voltage command based on the speed difference signal; determine an initial voltage command based on the speed difference signal; determine the final voltage command based on the initial voltage command; determine a disturbance torque acting on the brushed DC motor via the lead screw; and modify, to cause the brushed DC motor to produce a compensation torque offsetting the disturbance torque, at least one of the final voltage command and the speed difference signal. Modifying the at least one of the final voltage command and the speed difference signal includes at least one of: determining a feedforward voltage command based on a position of the load along the path and determining the final voltage command as a sum of the initial voltage command and the feedforward voltage command; or determining a speed compensation signal based on the disturbance torque and determining the speed difference signal further based on the speed compensation signal.

In some embodiments, the controller is further configured to determine the feedforward voltage command as a function of the position of the load along the path, and modifying the at least one of the final voltage command and the speed difference signal includes determining the final voltage command as a sum of the initial voltage command and the feedforward voltage command.

In some embodiments, determining the feedforward voltage command includes determining the feedforward voltage command $v_{ff}$ in accordance with:

$$v_{ff} = \frac{R}{K}\tau_{LF}(\theta),$$

where R is an electrical resistance of the brushed DC motor, K is an electromotive force constant, θ is the position of the load along the path, and $\tau_{LF}(\theta)$ is the disturbance torque as a function of the position θ of the load.

In some embodiments, the controller is further configured to determine the speed compensation signal based on the disturbance torque and to cause the brushed DC motor to produce a compensation torque to offset the disturbance torque, and modifying the at least one of the final voltage command and the speed difference signal includes determining the speed difference signal further based on the speed compensation signal.

In some embodiments, determining the speed compensation signal includes determining the speed compensation signal ω(s) in accordance with:

$$\omega(s) = T_{dist}\frac{Ls + R}{D(s)K_m},$$

where $T_{dist}$ is the disturbance torque, Ls is an inductance of the brushed DC motor, R is an electrical resistance of the brushed DC motor, D(s) is a transfer function describing a relationship between the speed difference signal and the final voltage command, and $K_m$ is a motor torque constant.

In some embodiments, determining the disturbance torque includes measuring the disturbance torque.

In some embodiments, determining the disturbance torque includes estimating the disturbance torque based on: a motor current in the brushed DC motor, and the motor speed of the brushed DC motor.

In some embodiments, estimating the disturbance torque includes computing an estimated disturbance torque in accordance with: $J\dot{\omega}=K_m i-b\omega-T_{dist}$, where J is rotational inertia, $\dot{\omega}$ is a derivative of the motor speed of the brushed DC motor, $K_m$ is a motor torque constant, i is the motor current in the brushed DC motor, b is a motor viscous friction constant, ω is the motor speed of the brushed DC motor, and $T_{dist}$ is the disturbance torque.

In some embodiments, estimating the disturbance torque includes computing the disturbance torque using a Luenberger observer in accordance with: $\dot{x}_e=(A-GC)x_e+Bu+Gy$, where $\dot{x}_e$ is a derivative of a state estimator, $x_e$ is the state estimator, G is an observer gain matrix, and where:

$$A = \begin{bmatrix} -\frac{b}{J} & \frac{K_b}{J} & -\frac{1}{J} \\ -\frac{K_m}{L} & -\frac{R}{L} & 0 \\ 0 & 0 & 1 \end{bmatrix}, B = \begin{bmatrix} 0 \\ 1/L \\ 0 \end{bmatrix},$$

$$C = \begin{bmatrix} 1 & 0 & 0 \\ 0 & 1 & 0 \end{bmatrix}, y = \begin{bmatrix} \omega \\ i \end{bmatrix} = \begin{bmatrix} 1 & 0 & 0 \\ 0 & 1 & 0 \end{bmatrix}\begin{bmatrix} \omega \\ i \\ T_{dist} \end{bmatrix},$$

u is the DC voltage applied to the brushed DC motor, J is rotational inertia, L is an inductance of the brushed DC motor, R is an electrical resistance of the brushed DC motor, $K_b$ is a motor back-EMF constant, $K_m$ is a motor torque constant, i is the motor current in the brushed DC motor, b is a motor viscous friction constant, ω is the motor speed of the brushed DC motor, and $T_{dist}$ is the disturbance torque.

The present disclosure also provides a method of controlling a brushed direct current (DC) motor. The method includes: determining a speed difference signal based on a difference between a speed command signal and a motor speed of the brushed DC motor; determining an initial voltage command based on the speed difference signal; determining a final voltage command based on the initial voltage command; applying a DC voltage to the brushed DC motor based on the final voltage command; determining a disturbance torque acting on the brushed DC motor; and modifying the speed difference signal to cause the brushed DC motor to produce a compensation torque offsetting the disturbance torque. Modifying the speed difference signal includes determining a speed compensation signal based on the disturbance torque and determining the speed difference signal further based on the speed compensation signal.

In some embodiments, determining the speed compensation signal includes determining the speed compensation signal ω(s) in accordance with:

$$\omega(s) = T_{dist}\frac{Ls + R}{D(s)K_m},$$

where $T_{dist}$ is the disturbance torque, Ls is an inductance of the brushed DC motor, R is an electrical resistance of the brushed DC motor, D(s) is a transfer function describing a relationship between the speed difference signal and the final voltage command, and $K_m$ is a motor torque constant.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in scope with the present disclosure. Additionally, while various embodiments of the present disclosure have been described, it is to be understood that aspects of the present disclosure may include only some of the described embodiments or combinations of the various embodiments. Accordingly, the present disclosure is not to be seen as limited by the foregoing description.

What is claimed is:

1. A method of controlling a brushed direct current (DC) motor, the method comprising:

determining a speed difference signal based on a difference between a speed command signal and a motor speed of the brushed DC motor;

determining an initial voltage command based on the speed difference signal;

determining a final voltage command based on the initial voltage command;

applying a DC voltage to the brushed DC motor based on the final voltage command and to cause the brushed DC motor to turn a lead screw and to thereby move a load along a path;

determining a disturbance torque acting on the brushed DC motor; and modifying, to cause the brushed DC motor to produce a compensation torque offsetting the disturbance torque, at least one of the final voltage command and the speed difference signal, wherein modifying the at least one of the final voltage command and the speed difference signal includes:

determining a feedforward voltage command based on a position of the load along the path and determining the final voltage command as a sum of the initial voltage command and the feedforward voltage command, and wherein determining the feedforward voltage command includes determining the feedforward voltage command $v_{ff}$ in accordance with:

$$v_{ff} = \frac{R}{K}\tau_{LF}(\theta),$$

where R is an electrical resistance of the brushed DC motor, K is an electromotive force constant, θ is the position of the load along the path, and $\tau_{LF}(\theta)$ is the disturbance torque as a function of the position θ of the load.

2. The method of claim 1, wherein determining the disturbance torque includes measuring the disturbance torque.

3. The method of claim 1, wherein determining the disturbance torque includes estimating the disturbance torque based on: a motor current in the brushed DC motor, and the motor speed of the brushed DC motor.

4. The method of claim 3, wherein estimating the disturbance torque includes computing an estimated disturbance torque in accordance with: $J\dot{\omega}=K_m i-b\omega-T_{dist}$, where J is rotational inertia, $\dot{\omega}$ is a derivative of the motor speed of the brushed DC motor, $K_m$ is a motor torque constant, i is the motor current in the brushed DC motor, b is a motor viscous friction constant, ω is the motor speed of the brushed DC motor, and $T_{dist}$ is the disturbance torque.

5. The method of claim 3, wherein estimating the disturbance torque includes computing the disturbance torque using a Luenberger observer in accordance with: $\dot{x}_e=(A-GC)x_e+Bu+Gy$, where $\dot{x}_e$ is a derivative of a state estimator, x, is the state estimator, G is an observer gain matrix, and where:

$$A = \begin{bmatrix} -\frac{b}{J} & \frac{K_b}{J} & -\frac{1}{J} \\ -\frac{K_m}{L} & -\frac{R}{L} & 0 \\ 0 & 0 & 1 \end{bmatrix}, B = \begin{bmatrix} 0 \\ 1/L \\ 0 \end{bmatrix},$$

$$C = \begin{bmatrix} 1 & 0 & 0 \\ 0 & 1 & 0 \end{bmatrix}, y = \begin{bmatrix} \omega \\ i \end{bmatrix} = \begin{bmatrix} 1 & 0 & 0 \\ 0 & 1 & 0 \end{bmatrix}\begin{bmatrix} \omega \\ i \\ T_{dist} \end{bmatrix},$$

u is the DC voltage applied to the brushed DC motor, J is rotational inertia, L is an inductance of the brushed DC motor, R is an electrical resistance of the brushed DC motor, $K_b$ is a motor back-EMF constant, $K_m$ is a motor torque constant, i is the motor current in the brushed DC motor, b is a motor viscous friction constant, ω is the motor speed of the brushed DC motor, and $T_{dist}$ is the disturbance torque.

6. A motor control system, comprising:

a brushed direct current (DC) motor having a set of brushes and configured to turn a lead screw and to thereby move a load along a path;

a voltage regulator configured to apply a DC voltage to the brushed DC motor based on a final voltage command; and a controller configured to:

determine a speed difference signal based on a difference between a speed command signal and a motor speed of the brushed DC motor;

determine an initial voltage command based on the speed difference signal;

determine the final voltage command based on the initial voltage command;

determine a disturbance torque acting on the brushed DC motor via the lead screw; and modify, to cause the brushed DC motor to produce a compensation torque offsetting the disturbance torque, at least one of the final voltage command and the speed difference signal, wherein modifying the at least one of the final voltage command and the speed difference signal includes:

determining a feedforward voltage command based on a position of the load along the path and determining the final voltage command as a sum of the initial voltage command and the feedforward voltage command, and wherein determining the feedforward voltage command includes determining the feedforward voltage command $v_{ff}$ in accordance with:

$$v_{ff} = \frac{R}{K}\tau_{LF}(\theta),$$

where R is an electrical resistance of the brushed DC motor, K is an electromotive force constant, θ is the position of the load along the path, and $\tau_{LF}(\theta)$ is the disturbance torque as a function of the position θ of the load.

7. The motor control system of claim 6, wherein determining the disturbance torque includes measuring the disturbance torque.

8. The motor control system of claim 6, wherein determining the disturbance torque includes estimating the disturbance torque based on: a motor current in the brushed DC motor, and the motor speed of the brushed DC motor.

9. The motor control system of claim 8, wherein estimating the disturbance torque includes computing an estimated disturbance torque in accordance with: $J\dot{\omega}=K_m i-b\omega-T_{dist}$, where J is rotational inertia, $\dot{\omega}$ is a derivative of the motor speed of the brushed DC motor, $K_m$ is a motor torque constant, t is the motor current in the brushed DC motor, b is a motor viscous friction constant, ω is the motor speed of the brushed DC motor, and $T_{dist}$ is the disturbance torque.

10. The motor control system of claim 8, wherein estimating the disturbance torque includes computing the disturbance torque using a Luenberger observer in accordance with: $\dot{x}_e=(A-GC)x_e+Bu+Gy$, where $\dot{x}_e$ is a derivative of a state estimator, $x_e$ is the state estimator, G is an observer gain matrix, and where:

$$A = \begin{bmatrix} -\frac{b}{J} & \frac{K_b}{J} & -\frac{1}{J} \\ -\frac{K_m}{L} & -\frac{R}{L} & 0 \\ 0 & 0 & 1 \end{bmatrix}, B = \begin{bmatrix} 0 \\ 1/L \\ 0 \end{bmatrix},$$

$$C = \begin{bmatrix} 1 & 0 & 0 \\ 0 & 1 & 0 \end{bmatrix}, y = \begin{bmatrix} \omega \\ i \end{bmatrix} = \begin{bmatrix} 1 & 0 & 0 \\ 0 & 1 & 0 \end{bmatrix}\begin{bmatrix} \omega \\ i \\ T_{dist} \end{bmatrix},$$

u is the DC voltage applied to the brushed DC motor, J is rotational inertia, L is an inductance of the brushed DC motor, R is an electrical resistance of the brushed DC motor, $K_b$ is a motor back-EMF constant, $K_m$ is a motor torque constant, i is the motor current in the brushed DC motor, b is a motor viscous friction constant, ω is the motor speed of the brushed DC motor, and $T_{dist}$ is the disturbance torque.

11. A method of controlling a brushed direct current (DC) motor, the method comprising:

determining a speed difference signal based on a difference between a speed command signal and a motor speed of the brushed DC motor;

determining an initial voltage command based on the speed difference signal;

determining a final voltage command based on the initial voltage command;

applying a DC voltage to the brushed DC motor based on the final voltage command;

determining a disturbance torque acting on the brushed DC motor; and modifying the speed difference signal to cause the brushed DC motor to produce a compensation torque offsetting the disturbance torque, wherein modifying the speed difference signal includes determining a speed compensation signal based on the disturbance torque and determining the speed difference signal further based on the speed compensation signal.

12. The method of claim 11, wherein determining the speed compensation signal includes determining the speed compensation signal ω(s) in accordance with:

$$\omega(s) = T_{dist}\frac{Ls + R}{D(s)K_m},$$

where $T_{dist}$ is the disturbance torque, L is an inductance of the brushed DC motor, s is a Laplace domain variable, R is an electrical resistance of the brushed DC motor, D(s) is a transfer function describing a relationship between the speed difference signal and the final voltage command, and $K_m$ is a motor torque constant.

13. A method of controlling a brushed direct current (DC) motor, the method comprising:

determining a speed difference signal based on a difference between a speed command signal and a motor speed of the brushed DC motor;

determining an initial voltage command based on the speed difference signal;

determining a final voltage command based on the initial voltage command;

applying a DC voltage to the brushed DC motor based on the final voltage command and to cause the brushed DC motor to turn a lead screw and to thereby move a load along a path;

determining a disturbance torque acting on the brushed DC motor, wherein determining the disturbance torque includes estimating the disturbance torque based on: a motor current in the brushed DC motor, and the motor speed of the brushed DC motor; and modifying, to cause the brushed DC motor to produce a compensation torque offsetting the disturbance torque, at least one of the final voltage command and the speed difference signal, wherein modifying the at least one of the final voltage command and the speed difference signal includes at least one of:

determining a feedforward voltage command based on a position of the load along the path and determining the final voltage command as a sum of the initial voltage command and the feedforward voltage command; or determining a speed compensation signal based on the disturbance torque and determining the speed difference signal further based on the speed compensation signal, and wherein estimating the disturbance torque includes at least one of:

computing an estimated disturbance torque in accordance with: $J\dot{\omega}=K_m i-b\omega-T_{dist}$, where J is rotational inertia, $\dot{\omega}$ is a derivative of the motor speed of the brushed DC motor, $K_m$ is a motor torque constant, t is the motor current in the brushed DC motor, b is a motor viscous friction constant, ω is the motor speed of the brushed DC motor, and $T_{dist}$ is the disturbance torque, or computing the estimated disturbance torque using a Luenberger observer in accordance with: $\dot{x}_e=(A-GC)x_e+Bu+Gy$, where $\dot{x}_e$ is a derivative of a state estimator, $x_e$ is the state estimator, G is an observer gain matrix, and where:

$$A = \begin{bmatrix} -\frac{b}{J} & \frac{K_b}{J} & -\frac{1}{J} \\ -\frac{K_m}{L} & -\frac{R}{L} & 0 \\ 0 & 0 & 1 \end{bmatrix}, B = \begin{bmatrix} 0 \\ 1/L \\ 0 \end{bmatrix}, C = \begin{bmatrix} 1 & 0 & 0 \\ 0 & 1 & 0 \end{bmatrix},$$

$$y = \begin{bmatrix} \omega \\ t \end{bmatrix} = \begin{bmatrix} 1 & 0 & 0 \\ 0 & 1 & 0 \end{bmatrix}\begin{bmatrix} \omega \\ t \\ T_{dist} \end{bmatrix},$$

u is the DC voltage applied to the brushed DC motor, J is rotational inertia, L is an inductance of the brushed DC motor, R is an electrical resistance of the brushed DC motor, $K_b$ is a motor back-EMF constant, $K_m$ is a motor torque constant, i is the motor current in the brushed DC motor, b is a motor viscous friction constant, ω is the motor speed of the brushed DC motor, and $T_{dist}$ is the disturbance torque.

14. The method of claim 13, wherein estimating the disturbance torque includes computing the estimated disturbance torque in accordance with: $J\dot{\omega}=K_m i-b\omega-T_{dist}$, where J is rotational inertia, $\dot{\omega}$ is a derivative of the motor speed of the brushed DC motor, $K_m$ is a motor torque constant, i is the motor current in the brushed DC motor, b is a motor viscous friction constant, ω is the motor speed of the brushed DC motor, and $T_{dist}$ is the disturbance torque.

15. The method of claim 13, wherein estimating the disturbance torque includes computing the estimated disturbance torque using a Luenberger observer in accordance with: $\dot{x}_e=(A-GC)x_e+Bu+Gy$, where $\dot{x}_e$ is a derivative of a state estimator, $x_e$ is the state estimator, G is an observer gain matrix, and where:

$$A = \begin{bmatrix} -\frac{b}{J} & \frac{K_b}{J} & -\frac{1}{J} \\ -\frac{K_m}{L} & -\frac{R}{L} & 0 \\ 0 & 0 & 1 \end{bmatrix}, B = \begin{bmatrix} 0 \\ 1/L \\ 0 \end{bmatrix}, C = \begin{bmatrix} 1 & 0 & 0 \\ 0 & 1 & 0 \end{bmatrix},$$

$$y = \begin{bmatrix} \omega \\ t \end{bmatrix} = \begin{bmatrix} 1 & 0 & 0 \\ 0 & 1 & 0 \end{bmatrix}\begin{bmatrix} \omega \\ t \\ T_{dist} \end{bmatrix},$$

u is the DC voltage applied to the brushed DC motor, J is rotational inertia, L is an inductance of the brushed DC motor, R is an electrical resistance of the brushed DC motor, $K_b$ is a motor back-EMF constant, $K_m$ is a motor torque constant, i is the motor current in the brushed DC motor, b is a motor viscous friction constant, ω is the motor speed of the brushed DC motor, and $T_{dist}$ is the disturbance torque.

* * * * *